Feb. 27, 1968  P. I. NORDSTROM  3,370,707

OIL FILTER, PARTICULARLY FOR AUTOMOTIVE VEHICLES

Filed May 18, 1965

*INVENTOR.*
PER INGEMAR NORDSTROM

BY *Fritz G. Hochwalt*

AGT.

3,370,707
OIL FILTER, PARTICULARLY FOR
AUTOMOTIVE VEHICLES
Per Ingemar Nordstrom, 913 Entre Rios,
Buenos Aires, Argentina
Filed May 18, 1965, Ser. No. 456,659
Claims priority, application Argentina, Sept. 8, 1964,
189,898, Pat. 141,187
6 Claims. (Cl. 210—94)

ABSTRACT OF THE DISCLOSURE

An exchangeable oil filter containing in superposed relationship (1) a specific disc assembly acting as centrifugal separator for the heavy impurities of the oil, (2) a conventional filter portion, and (3) a disc and filter paper assembly pressed against (1) and (2) and provided with slots and fins, which 3 sections are passed by the oil from the bottom of (1) to the top of (3).

The present invention refers to a novel filter for oil. Its principal object is to provide a constructive arrangement embodying features different from those so far known in the art and of improved performance compared with previously known devices of the same kind.

By means of the arrangement of elements constituing the principal object of this invention, it is possible that the filter be made to operate in three different and successive manners, namely, to effect a pre-filtering through a plurality of screens, taking advantage of the centrifugal action of the oil rotationally circulating therethrough; said preliminary filtering being followed by a first intense filtering step properly speaking by providing a vertical run through a mass of filter material, followed by a second filtering, of high effective results, through a filter consisting of cloth and micronic paper.

In this manner, during the prefiltering step the heavier particles are removed through the screens, thus avoiding clogging of the filter materials. During the first and second filtering steps, it is possible to remove entirely the fine particles which may still be in suspension in the oil.

It is also an object of the present invention to provide a specific arrangement for the casing which contains the prefiltering and post-filtering means. By means of this arrangement, it is possible to renew the above devices without difficulty and without having to remove the base, the filter means and the casing constituting a unit assembly in the form of an unmovable filter element supported by a base in which are arranged the inlet and outlet means feeding and discharging oil from the filter.

Furthermore, as a complementary object, the filter is provided with a cover of transparent material. This cover permits the state of the oil to be seen as it passes through the filter, thus offering a ready control means of the state of the filter element itself, and its operative conditions. Likewise, the base supporting the casing is provided with a support element consisting of a resilient connection between said casing and the engine, thus avoiding the transmission of vibrations from the latter to the filter element, harmful to operation and structure.

The invention likewise envisages other accessory objects, as will be made clear during the course of the present description.

In order that the present invention may be more clearly understood and readily put into practice, it will now be described with particular reference to a preferred embodiment, illustrated as an example in the attached drawings.

In the drawings.

Like numerals represent like or similar parts throughout the several figures of the drawing.

Figure 1:
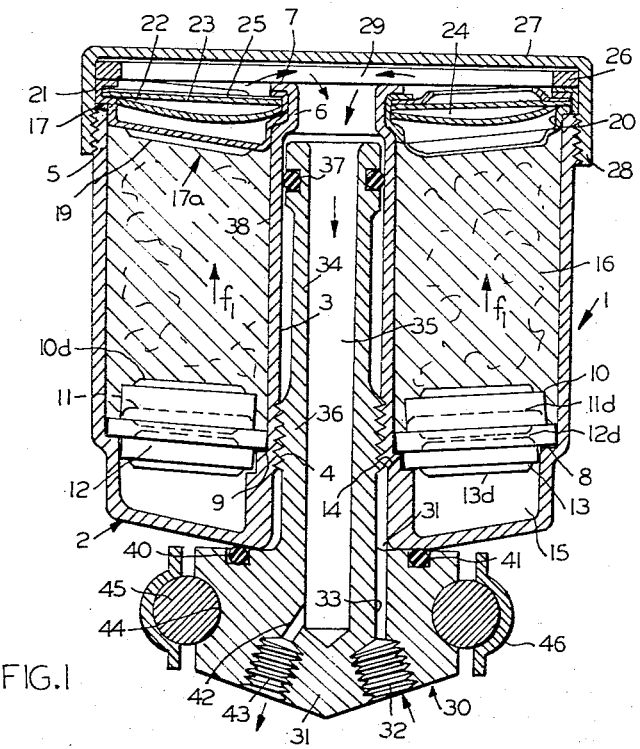
FIGURE 1 is a diametral sectional view of the preferred embodiment of the new filter constituting the principal object of the invention.
Figure 4:
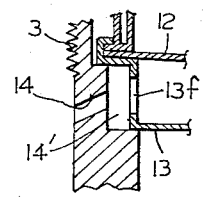
FIGURE 4, finally, shows a detail on a larger scale of the oil inlet to the filter.
Figure 3:
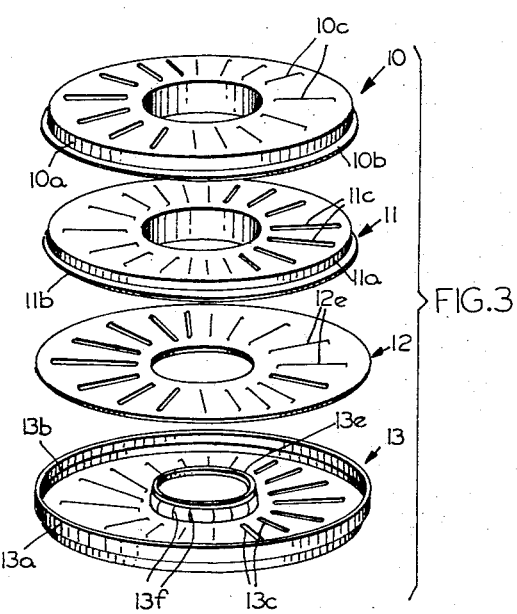
FIGURE 3 is an exploded view of the screens or grilles used for the prefiltering step.

In every respect according to the drawings, the new oil filter comprises a casing 1 providing the outer part projecting into an annular base 2 which continues in a central tubular portion 3. The latter, adjacent the base, presents a threaded portion 4. Opposite the base, the casing finishes in an edge 5, likewise threaded, whereas its central tubular portion, in the corresponding terminal area, is provided with a recess 6 terminating in a lip portion 7, completing said recess 6. Adjacent to 2, the inner portion of the casing is provided with a step 8 corresponding to a second step 9 provided in the inside surface of the central tubular portion 3. Said steps define a seat for a plurality of discoidal members 10, 11, 12 and 13, forming an assembly to be detailed later on.

The discoidal member 10 is provided with a cylindrical skirt 10a, terminating in an outside annular flange 10b, resting on a corresponding flange 11b projecting from cylindrical flange 11a, of a second disc member 11, the height of said skirt being less than that of 10a. Flange 11b rests on step 13b formed in the cylindrical skirt 13a of member 13, through intermediate member 12.

Part 13 is provided with a plurality of slits 13c, limited by a fin 13d, arranged on the rear edge thereof in counterclockwise direction. Element 12, on the other hand, is provided with similar slits, indicated by reference 12c, and fins 12d, directed towards 11, the latter member, as likewise part 10, being provided with slits 11c, 10c and fins 11d, 10d, directed oppositely to one another.

Figure 2:
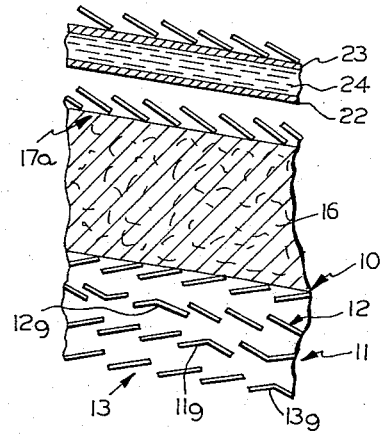
FIGURE 2 illustrates a detail on a larger scale, regarding the arrangement of the filter means.

Furthermore, member 13 is provided with a neck 13e having finned apertures 13f for the passage of oil into said filter cavity. Similarly, disc-like members 11, 12 and 13 are furnished with fins 11g, 12g and 13g, for the discharge of the heavy particles, as has been illustrated in FIGURE 2.

The assembly referred to above acts as a centrifugal separator for the heavier impurities. In fact, the oil which enters the space defined between the outer and the inner portions of the casing, passes through tangential orifice 14 into annular chamber 14', penetrates through apertures 13f of neck 13e of member 13, and finally enters the space formed by the disc-like members, is impressed with a rotary movement which causes the heavier particles, following helical paths, to collide with the fins, thus losing velocity and falling into space 15, which acts as a receptacle for the heavy impurities in question.

A mass of filter material is located above the assembly of disc-like members 10, 11, 12 and 13. The oil passing therethrough and emerging from 10c, follows a vertical path, indicated by arrows $f_1$ and is, in this manner, submitted to a first filtering.

A second assembly of disc members and filter material is supported against the edge of the outer portion of casing 1, through gasket 17 and over recess 6, thus compressing the mass of filter material 16, and, consequently, exerting pressure also on the first assembly of disc members. Said second assembly consists of a disc member 17a, having radial slits 18, with corresponding fins 19, directed towards 16. Said member is surrounded by a cylindrical skirt 20, terminating in a U-section part identified by reference 21, holding felt discs 22 and 23 which cover a mass of filter paper 24, preferable of the micronic type. This charge of discs and filter paper is surmounted by a disc member 25, provided with its corresponding radial slits and fins, in such a manner that the oil coming from mass 16 passes through slits 18, guided by fins 19 and is filtered absolutely through 22, 24 and 23, leaving completely filtered through radial slits 25.

A gasket of rubber or similar material is placed over the second assembly of disc-like members, just described. This gasket 26 is pressed down by transparent cover 27, threaded at 28, over the edge of outside portion of casing 1.

The above-described assembly represents the filter unit. This renewable filter unit completely filters the oil, which leaves through space 29 located between the inside face of cover 27 and the edge of the central part 3 of the casing, as shown by the arrows in FIGURE 1. Said unit can be fixed above base 30, consisting of a body portion 31, in which are formed the inlet conduit for the oil to be filtered 32, followed by a restricted-diameter communicating conduit 33, exiting into an area 31, opposite to that containing said oil inlet 32.

From the central area of the body portion 31 a cylindrical support portion 34 extends to provide a hollow cylinder with a slightly widened middle portion as shown at 36. The outside face of same is threaded, said support 34 terminating in an edge having a throat 37 to receive a gasket ring 38. Over body portion 31, and about support 34, a receiving part 40 is provided for a second gasket ring 41. On the other hand, the inside of support 34, by means of borehole 42, communicates with the outlet conduit 43 provided for the filtered oil.

In this manner, the unit constituting the filter element is placed on its base by inserting its central tubular portion 3 inside the cylindrical support 34, screwing 4 into 36, thus causing the ring-shaped base 2 to press against gasket 41, providing a sealed union. Between the same and widened portion 36 a passage of communication between 33 and 14 is formed. Outlet 29 exits into 35, the gasket 38 providing a seal between support 34 and 3. The arrows of FIGURE 1 clearly indicate the path followed by the oil from inlet 32 up to outlet 43. Orifice 14 is of reduced diameter in order to reduce the oil pressure at the inlet to the filter element.

Base 30 is preferably provided with a recess 44 for the ring of resilient material 45. Support 46 is secured thereto, joining the assembly to the part which is to hold the filter. This connection provides an anti-vibration support which, as has been stated, avoids that the filter be disturbed by engine vibrations or by vibrations from the vehicle itself.

The union between the cover 27 and the envelope, shown as threaded, may be of any other equivalent form. Similarly, the cover can be of opaque material, this being a feature which does not affect the operation of the filter, transparency being preferable only in order to be able to observe directly the characteristics of the oil being filtered, and to be able to determine when the filter element is to be renewed, once its filtering capacity has become exhausted.

The invention as herein described can be readily understood and carried into practice, and no further explanations will be required by those persons versed in the art.

It is evident that sundry alterations as to construction and detail may be made without thereby departing from the true scope of the present invention, as clearly defined in the following claims.

I claim:
1. A new oil filter, comprising a support base having an insertion part formed therein, to receive a fixed filter element; an oil inlet and an oil outlet area and a region for connection with the filter support means; the insertion part being formed by a tubular projection extending from a flat portion of the said base, the free end of which is open and provided with a widened portion of the same diameter as that of a second widened part formed close to the base and having a threaded outside surface; the filter element consisting of a cylindrical casing continuing in an annular base part from which a tubular part is projected containing a filtering portion adapted to be inserted and affixed in threaded engagement above the connection region of the base; said casing containing a first assembly of discord members having radial passages separated from the annular region of the base; filter material being extended over said radial passages, compressed by a second assembly of discoid members between which a second body of filter material is lodged, supporting, with an intermediate gasket ring, a cover to close the assembly, an access orifice being provided in the tubular region of the casing, registering with the first assembly of discoid members, said access opening leading from inside the casing to the aforesaid tubular region.

2. A novel oil filter as claimed in claim 1, characterized by the fact that the tubular extension is provided with a communicating passage in the part adjacent the base thereof, communicating the inside with the outlet means provided for the filtered oil.

3. A novel oil filter as claimed in claim 1, characterized by the fact that the first assembly of discoid members consists of four annular pieces provided with radial slits surrounded at one of the sides thereof by corresponding fins directed towards the adjacent pieces and inclined in opposite directions, the said pieces being joined by flanging the corresponding cylindrical slits surrounding said pieces on the outside thereof.

4. A novel oil filter as claimed in claim 1, characterized by the fact that the second assembly of discoid members consists of a pair of outside annular pieces provided with radial slits, surrounded at one of the sides thereof by corresponding fins directed outwardly from the outside faces thereof, a pair of annular filter members being secured therebetween, to cover a body of micronic filter paper.

5. A novel oil filter, in accordance with claim 1, characterized by the fact that the cover closing the casing is of transparent material and that, between the inner face thereof and the edge of the tubular part of the said casing, a passage is defined for the filtered oil coming from the second assembly of discoid members and flowing towards the inside of the aforementioned part.

6. A novel oil filter, in accordance with claim 1, characterized by the fact that the connection region of the support base is formed by a throat having a semi-circular cross-section and receiving an annular piece of antivibratory resilient material surrounded by a clamp provided with means for connecting same to the filter support region.

No references cited.

SAMIH N. ZAHARNA, *Primary Examiner.*